(12) United States Patent
Kasper et al.

(10) Patent No.: US 8,090,607 B2
(45) Date of Patent: Jan. 3, 2012

(54) RE-OPTIMIZATION TECHNIQUE FOR USE WITH AN AUTOMATED SUPPLY CHAIN OPTIMIZER

(75) Inventors: Thomas Kasper, Wiesloch (DE); Mathias Goebelt, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1428 days.

(21) Appl. No.: 11/605,047

(22) Filed: Nov. 27, 2006

(65) Prior Publication Data
US 2007/0129992 A1    Jun. 7, 2007

(30) Foreign Application Priority Data
Dec. 1, 2005 (EP) .................................... 05026280

(51) Int. Cl.
*G06Q 10/00* (2006.01)
(52) U.S. Cl. ....................................................... 705/7.11
(58) Field of Classification Search .................... 705/7.11
See application file for complete search history.

(56) References Cited

U.S. PATENT DOCUMENTS

| | | | |
|---|---|---|---|
| 7,398,512 B2 * | 7/2008 | Martin et al. ............ | 717/105 |
| 7,672,862 B1 * | 3/2010 | Venkatasubramanyan et al. ......................... | 705/8 |
| 2002/0156663 A1 * | 10/2002 | Weber et al. ............. | 705/7 |
| 2005/0144033 A1 * | 6/2005 | Vreeke et al. ............ | 705/1 |
| 2005/0171826 A1 * | 8/2005 | Denton et al. ............ | 705/8 |
| 2005/0209732 A1 * | 9/2005 | Audimoolam et al. ... | 700/216 |
| 2006/0186998 A1 * | 8/2006 | Lin et al. ................. | 340/10.41 |
| 2007/0192160 A1 * | 8/2007 | Nephew et al. .......... | 705/10 |

OTHER PUBLICATIONS

Susan D. Urban and Mario Desiderio CONTEXT: A CONstrainT EXplanation Tool.: Data & Knowledge Engineering vol. 8, Issue 2, May 1992, pp. 153-183 doi:10.1016/0169-023X(92)90035-A.*

Samir Ouis and Mohamed Tounsi. "An explanation-based tools for debugging constraint satisfaction problems." Applied Soft Computing, vol. 8, No. 4, pp. 1400-1406, 2008.*

(Continued)

*Primary Examiner* — Romain Jeanty
*Assistant Examiner* — George H Walker
(74) *Attorney, Agent, or Firm* — Blakely, Sokoloff, Taylor & Zafman LLP (57) ABSTRACT

An explanation device operates to generate explanatory information for a user regarding the cause of any demands that could not be satisfied by an automated supply chain optimizer. The explanation device identifies the cause for any unsatisfied demands by successively relaxing various supply chain constraints while controlling the supply chain optimizer to re-optimize the supply chain subject to the relaxed constraints. If a previously unsatisfied demand is satisfied during re-optimization by relaxing a given constraint, then that constraint is deemed to have been a factor in the original, unsatisfied demand. If so, explanatory information is output to the user regarding the constraint. The amount by which the constraint was originally violated during the initial optimization may also be determined and provided to the user as further explanatory information.

15 Claims, 10 Drawing Sheets

OTHER PUBLICATIONS

J. Christopher Beck and Mark S. Fox. (Supply Chain Coordination via Mediated Constraint Relaxation, Proceedings of the First Canadian Workshop on Distributed Artificial Intelligence, May 15, 1994).*

Roman Bartak. Modelling Soft Constraints: A Survey. Neural Network World, 2002, vol. 12, pp. 421-431.*

Stephen C. Graves, Sean P. Willems, and Paul Zipkin. "Optimizing Strategic Safety Stock Placement in Supply Chains." Manufacturing & Service Operations Management 2, No. 1 (Winter2000 2000): 68. Business Source Complete, EBSCOhost (accessed Sep. 9, 2010).*

Sandra Duni Eksioglu "Optimizing Integrated Production, Inventory and Distribution Problems in Supply Chains" A Dissertation University of Florida 2002.*

Haoxun Chen and Chengbin Chu. "A Lagrangian relaxation approach for supply chain planning with order/setup costs and capacity constraints." Journal of Systems Science and Systems Engineering, vol. 12, No. 1, pp. 98-110, Mar. 2003.*

S. David Wu and Hakan Golbasi. "Multi-Item, Multi-Facility Supply Chain Planning: Models, Complexities, and Algorithms." Computational Optimization & Applications 28, No. 3 (Sep. 2004): 325-356. Computers & Applied Sciences Complete, EBSCOhost (accessed Sep. 9, 2010).*

J. J Christopher Beck and Mark S. Fox. (Supply Chain Coordination via Mediated Constraint Relaxation, Proceedings of the First Canadian Workshop on Distributed Artificial Intelligence, May 15, 1994).*

J. Christopher Beck ("A Schema for Constraint Relaxation with Instantiations for Partial Constraint Satisfaction and Schedule Optimization," Masters Thesis, University of Toronto, 1994.*

Köksalan, Murat, and Robert D. Plante. "Interactive Multicriteria Optimization for Multiple-Response Product and Process Design." Manufacturing & Service Operations Management 5, No. 4 (Fall2003 2003): 334-347. Business Source Complete, EBSCOhost.*

Ben-Tal, Aharon, et al. "Retailer-Supplier Flexible Commitments Contracts: A Robust Optimization Approach." Manufacturing & Service Operations Management 7, No. 3 (Summer2005 2005): 248-271. Business Source Complete, EBSCOhost.*

Schwindt, C., and N. Trautmann. "Scheduling the production of rolling ingots: industrial context, model, and solution method." International Transactions in Operational Research 10, No. 6 (Nov. 2003): 547. Business Source Complete, EBSCOhost (accessed Sep. 13, 2010).*

Sandra Duni Eksioglu "Optimizing Integrated Production, Inventory and Distribution Problems in Supply Chains" A Dissertation University of Florida 2002.*

Haoxun Chen and Chengbin Chu. "A Lagrangian relaxation approach for supply chain planning with order/setup costs and capacity constraints." Journal of Systems Science and Systems Engineering, vol. 12, No. 1, pp. 98-110, Mar. 2003.*

S. David Wu and Hakan Golbasi. "Multi-Item, Multi-Facility Supply Chain Planning: Models, Complexities, and Algorithms." Computational Optimization & Applications 28, No. 3 (Sep. 2004): 325-356. Computers & Applied Sciences Complete, EBSCOhost (accessed Sep. 9, 2010).*

Susan D. Urban and Mario Desiderio CONTEXT: A CONstrainT EXplanation Tool.: Data & Knowledge Engineering vol. 8, Issue 2, May 1992, pp. 153-183 doi:10.1016/0169-023X(92)90035-A.*

Samir Ouis and Mohamed Tounsi. "An explanation-based tools for debugging constraint satisfaction problems." Applied Soft Computing, vol. 8, No. 4, pp. 1400-1406, 2008.*

* cited by examiner

| Location | Product | Bucket From | Bucket To | Priority Class | Non-Delivery in % | Safety Stock Violation in % |
|---|---|---|---|---|---|---|
| L1 | P1 | 1 | 5 | Customer Demand | 20 | 10 |
| L1 | P2 | 1 | 5 | Customer Demand | 10 | 15 |
| L2 | P1 | 1 | 5 | Customer Demand | 5 | 7 |

Messages | Capacity Problems | Bound Problems | Product Availability Problems | Leadtime Problems | Order Proposal

| Type | Message Text |
|---|---|
| Info | Explanation found |

FIG. 6

| Location | Product | Bucket From | Bucket To | Priority Class | Non-Delivery in % | Safety Stock Violation in % |
|---|---|---|---|---|---|---|
| L1 | P1 | 1 | 5 | Customer Demand | 20 | 10 |
| L1 | P2 | 1 | 5 | Customer Demand | 10 | 15 |
| L2 | P1 | 1 | 5 | Customer Demand | 5 | 7 |

Messages | Capacity Problems | Bound Problems | Product Availability Problems | Leadtime Problems | Order Proposal

| Resource | Bucket | Missing Capacity |
|---|---|---|
| R1 | 3 | 20 |

Info

FIG. 7

| Location | Product | Bucket From | Bucket To | Priority Class | Non-Delivery in % | Safety Stock Violation in % |
|---|---|---|---|---|---|---|
| L1 | P1 | 1 | 5 | Customer Demand | 20 | 10 |
| L1 | P2 | 1 | 5 | Customer Demand | 10 | 15 |
| L2 | P1 | 1 | 5 | Customer Demand | 5 | 7 |

Messages | Capacity Problems | Bound Problems | Product Availability Problems | Leadtime Problems | Order Proposal

| Activity | Type | Product | Bucket | Bound Increase |
|---|---|---|---|---|
| PPM1 | P | P1 | 3 | 12 |

Info

FIG. 8

| Location | Product | Bucket From | Bucket To | Priority Class | Non-Delivery in % | Safety Stock Violation in % |
|---|---|---|---|---|---|---|
| L1 | P1 | 1 | 5 | Customer Demand | 20 | 10 |
| L1 | P2 | 1 | 5 | Customer Demand | 10 | 15 |
| L2 | P1 | 1 | 5 | Customer Demand | 5 | 7 |

Messages | Capacity Problems | Sound Problems | Product Availability Problems | Leadtime Problems | Order Proposal

| Location | Product | Bucket | Quantity |
|---|---|---|---|
| L1 | C1 | 2 | 20 |

[Info]

FIG. 9

| Location | Product | Bucket From | Bucket To | Priority Class | Non-Delivery in % | Safety Stock Violation in % |
|---|---|---|---|---|---|---|
| L1 | P1 | 1 | 5 | Customer Demand | 20 | 10 |
| L1 | P2 | 1 | 5 | Customer Demand | 10 | 15 |
| L2 | P1 | 1 | 5 | Customer Demand | 5 | 7 |

| Location | Product | Activity | Type | Quantity | Start Date | End Date | Days In Horizon | In Past |
|---|---|---|---|---|---|---|---|---|
| L1 | C1 | PPM1 | P | 13 | 1.10.2004 | 1.10.2004 | 3 | |
| L1 | C1 | | | 7 | | | | X |

FIG. 10

RE-OPTIMIZATION TECHNIQUE FOR USE WITH AN AUTOMATED SUPPLY CHAIN OPTIMIZER

FIELD

The invention generally relates to computer-supported optimization techniques and more specifically to computer-implemented systems and methods for supply chain re-optimization.

BACKGROUND

Supply chain planning is essential to the success of many of today's manufacturing firms. Most manufacturing firms rely on supply chain planning in some form to ensure the timely delivery of products in response to customer demands. Typically, supply chain planning is hierarchical in nature, extending from distribution and production planning driven by customer orders, to materials and capacity requirements planning, to shop floor scheduling, manufacturing execution, and deployment of products. Supply chain planning ensures the smooth functioning of different aspects of production, from the ready supply of components to meet production demands to the timely transportation of finished goods from the factory to the customer.

One key aspect in the hierarchical supply chain planning approach is the generation of a mid-term production and distribution plan. This planning is commonly referred to as supply-net-work-planning (SNP), supply network planning (SNP), and the term SNP will be frequently used herein.

One particularly effective tool for supply chain planning is the Advanced Planner and Optimizer (APO) provided by SAP AG. APO belongs to the class of Advanced Planning Systems (APS) and covers all supply chain planning tasks. An integral part of APO is the Supply Network Planning Module. Within the SNP module, different planning methods are available, the most comprehensive being the SNP optimizer. Using the SNP module, a user, such as a supply chain planner or supervisor, generates and maintains an electronic SNP model that defines which entities of a supply chain should be planned and further specifies any constraints that should be respected during optimization.

The model also specifies one or more demands that should be met, either wholly or partially. Demands typically relate to the delivery of some number of products to a particular customer at a particular time. Also, the user generates and maintains a cost model, which is used by the optimizer for evaluating feasible supply chain solutions that ideally meet all the demands subject to all the constraints while requiring minimal supply chain costs. A cost-based optimizer evaluates all feasible supply chain solutions and searches for a global solution that has a minimum cost evaluation. It should be noted here that the term "cost" does not—or at least not necessarily—relate to a monetary value but generally denotes a typically penalty-based parameter utilized by the optimization mechanism to find an optimal solution.

Hence, optimization is performed from a global perspective to allow high quality planning solutions. However, it is sometimes difficult for the user to understand the solution from a "local" perspective, with which users are typically more familiar. For example, a user may not understand why a certain demand was not satisfied within the optimized supply chain. This is particularly true if the optimized supply chain takes into account global constraints with which the user is not familiar. In one global scenario, a demand may not or not completely be satisfied due to limited production capabilities on different levels of a production chain. In another global scenario, a demand may not or not completely be satisfied due to finite capacities in a multilevel distribution chain including the handling, transport and storage of products underlying the demand. In such multilevel optimization contexts, it is often difficult to localize the reason for an individual bottleneck.

Accordingly, it would be desirable to provide an automated mechanism for quickly and efficiently analyzing an optimized supply chain planning problem and for providing a computer-generated explanation of why certain demands could not (or not fully) be met.

It is therefore an object of the present invention to provide an automated explanation technique that is technically compatible with existing APSs such as the APO and that is capable of automatically generating meaningful information for a user of the APS.

SUMMARY

In one embodiment, the invention provides a method for use with an automated supply chain optimizer that optimizes a supply chain subject to at least one user demand and one or more corresponding constraints. The method provides information to a user regarding an unsatisfied demand. In one embodiment, a constraint that potentially corresponds to the unsatisfied demand is relaxed and then the optimizer is controlled to re-optimize the supply chain using the relaxed constraint. A determination is made whether the demand was satisfied during re-optimization. Then, information is provided to the user regarding the cause of the unsatisfied demand based on whether the demand was satisfied during re-optimization using the relaxed constraint.

The proposed re-optimization approach is technically compatible with optimization-based APSs and can thus easily be coupled with such tools. Moreover, it has been found that the approach of (e.g. successively) relaxing one or more constraints can be automated and delivers information having an explanatory meaning to a user of the tool.

In the context of the present invention, an unsatisfied demand denotes any demand that could not or not fully (e.g. only to a certain percentage) be satisfied. Also, an unsatisfied demand encompasses violations of a predefined safety stock or inventory. In other words, a demand may be classified as "unsatisfied" if satisfaction of the demand is only possible under a violation of a predefined minimum inventory or stock.

A feasible solution to an optimization problem need not necessarily satisfy all demands since demand satisfaction is typically a "soft" constraint (i.e. a constraint that may be violated against penalties). Since the costs are to be minimized, the optimizer aims at maximizing demand satisfaction in accordance with the cost model.

In one example, if the demand was satisfied during re-optimization, an indication is provided to the user that the constraint that had been relaxed was a factor in the original, unsatisfied demand. In addition, the amount by which the constraint would have had to be violated during the initial optimization in order to satisfy the demand in question may be determined and an indication of that amount may be provided to the user as a further explanation of the reason the demand could not originally be satisfied. On the other hand, if the demand was still not satisfied during re-optimization despite relaxation of the constant, an indication may be provided to the user that the constraint that was relaxed was not a significant factor in the unsatisfied demand.

Preferably, relaxing a constraint, controlling the optimizer to re-optimize the supply chain using the relaxed constraint, and then determining whether the demand was satisfied during re-optimization are performed successively using a plurality of different constraints until the demand is ultimately satisfied. The plurality of different constraints may be prioritized so that explanations that are likely to be the most useful to the user are provided first. In an example where the constraints include one or more of non-delivery penalty constraints, capacity constraints, activity bound constraints, material availability constraints, planning horizon constraints and cost constraints, the constraints may be prioritized in the order of (1) non-delivery penalty constraints, (2) capacity constraints, (3) activity bound and maximum lot constraints, (4) planning horizon constraints, and (5) material availability constraints.

Also preferably, the information provided to the user is filtered so as to prevent too much information from being provided that would make it difficult for the user to extract useful information. The information provided to the user may be filtered based, e.g., on time, location-products, demand priority classes and various thresholds. Furthermore, the resolution or "granularity" of information provided to the user may be adjusted. Recommendations regarding constraints that could be modified to allow an unsatisfied demand to be satisfied during a subsequent optimization may also be provided to the user. The recommendations may include an order proposal.

In one example, relaxing a constraint includes modifying a hard constraint to a pseudo-hard constraint. Whereas hard constraints have to be necessarily (fully) satisfied, pseudo-hard constraints are demands that may be violated against (typically very high) penalties. Such an approach can be used to ensure that it is always possible to find a feasible solution to a planning problem (taking into account that the feasible solution may be associated with very high costs) for a later re-optimization.

In another embodiment, the invention provides an explanation device for use with a supply chain optimizer that optimizes a supply chain subject to at least one user demand and one or more corresponding constraints. The explanation device operates to provide information to a user regarding an unsatisfied demand. The tool comprises: a constraint relaxation unit operative to relax a constraint that corresponds to the unsatisfied demand; a re-optimization controller unit operative to control the optimizer to re-optimize the supply chain using the relaxed constraint; a demand satisfaction determination unit operative to determine whether the demand was satisfied during re-optimization; and an explanation generation unit operative to generate information for presentation to the user regarding the cause of the unsatisfied demand based on whether the demand was satisfied during re-optimization using the relaxed constraint.

The invention may also be embodied in a computer program product, which may be stored on a computer readable recording medium, comprising program code portions for performing any of the operations of the above-described methods when the computer program product is run on a computer system. The invention may further comprise an apparatus comprising a computer processor and a memory coupled to the processor, where the memory is encoded with one or more programs that may perform any of the steps of the above-described methods.

BRIEF DESCRIPTION OF THE DRAWINGS

Further details, embodiments, modifications and enhancements of the invention may be obtained from consideration of the following description of various illustrative embodiments of the invention in conjunction with the drawings in which.

DETAILED DESCRIPTION

1. Overview of Explanation Device

Figure 1:
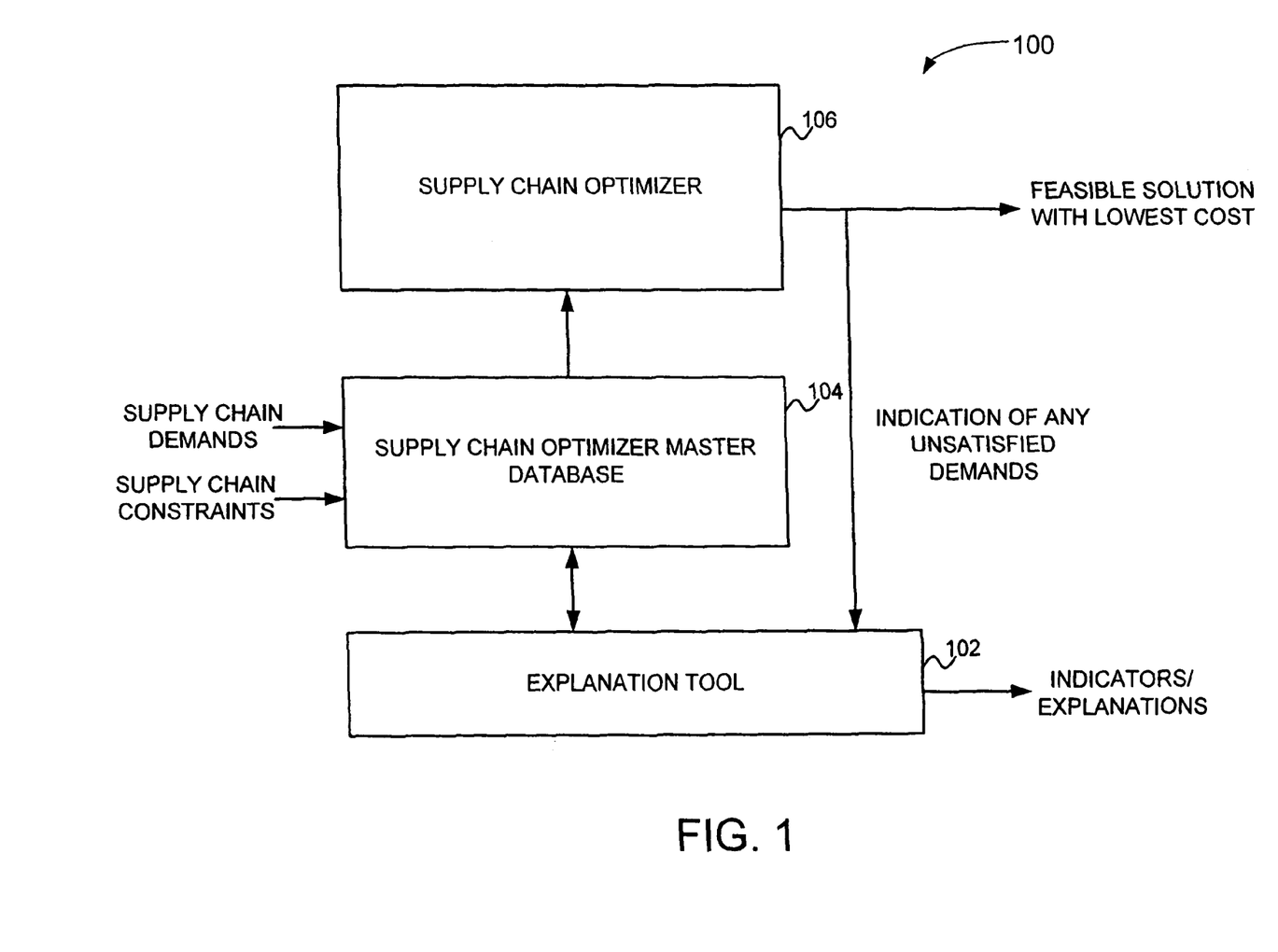
FIG. 1 is a block diagram illustrating, at a high level, an explanation device for use with a supply chain optimizer.

FIG. 1 provides a high-level overview of a supply chain optimization computer system 100, which includes an explanation device 102 for providing explanations to a user regarding any unsatisfied demands arising during optimization of a supply chain. Briefly, a set of supply chain demands and constraints are provided by the user and stored within a supply chain optimizer master database 104. A supply chain optimizer 106 accesses the demands and constraints and a supply chain model stored within the database and attempts to find a set of feasible solutions to the supply chain model that satisfies all of the demands subject to all of the constraints, or that at least maximizes satisfaction of the demands.

If a set of feasible solutions is found, the optimizer identifies a solution that has the lowest cost, i.e. an optimal solution from a cost standpoint. If no solution with full demand satisfaction can be found by the optimizer, i.e. some demands can not be satisfied subject to the constraints, then a set of indications of any demands that have not been satisfied is generated. Preferably, the optimizer employs linear programming techniques to solve the supply chain problem. However, other techniques known in the art can likewise be used for this purpose. Hence, the invention is not limited for use with linear programming techniques.

Explanation device 102 receives the indication of unsatisfied demands provided by optimizer 106 and operates to generate one or more explanations for the user regarding the cause of the unsatisfied demands. As will be explained more fully below, explanation device 102 determines the explanation for any unsatisfied demands by successfully relaxing the supply chain constraints stored within database 104 and while controlling the supply chain optimizer to re-optimize the supply chain subject to the relaxed constraints.

If a previously unsatisfied demand is satisfied during re-optimization by relaxing a given constraint, then that constraint is deemed to have been a factor in the original, unsatisfied demand. If so, explanatory information is provided to the user regarding the constraint. The amount by which the constraint was originally violated during the initial optimization may also be determined and provided to the user as further explanatory information.

By "factor", it is meant that the constraint had an influence on whether the demand was satisfied. Numerous constraints may each be a factor in any given unsatisfied demand. Accordingly, filters can be employed in providing explanatory information to the user so as to ensure that only the most pertinent information is provided. Additionally, the resolution or granularity of the information provided may be adjusted or selected based upon the particular demand or constraint. All this will be described in greater detail below.

On the other hand, if a previously unsatisfied demand is still unsatisfied during re-optimization despite relaxation of a constraint, then that constraint is deemed not to have been a significant factor in the original, unsatisfied demand. Of course, if the constraint is relaxed even further or is eliminated completely, it is possible that the demand might then be satisfied during re-optimization. Accordingly, the fact that the initial relaxation of a constraint does not result in the demand being satisfied does not mean that the constraint was not a factor at all, it merely was not a significant factor. Typically, explanatory information is only provided for constraints that were determined to be significant factors. In any case, if a previously unsatisfied demand is still unsatisfied despite relaxation of the constraint, additional or alternative constraints are selectively relaxed, and the re-optimization process is repeated.

The iterative process of selectively relaxing constraints and then re-optimizing the supply chain based on the relaxed constraints is repeatedly performed using different constraints, preferably until all demands are satisfied so that useful explanations can be provided for all previously unsatisfied demands. The order by which the constraints are successively relaxed is prioritized so that explanations that are likely to be most useful to the user are provided first, with potentially less useful explanations provided subsequently.

Hence, explanation device 102 provides explanations to the user regarding unsatisfied demands that arise during supply chain optimization. It should be understood that the term "demand", as used herein, does not necessarily imply that the demand must be satisfied in order for a feasible solution to be found. Some demands, so-called "hard" demands, do indeed need to be satisfied for a feasible solution to be found. However, other demands, which are characterized as "soft" demands or "pseudo-hard demands", need not be fully satisfied. Some demands may be only partially satisfied during generation of a feasible solution. Hence, the fact that a feasible solution was found does not mean that all user demands were necessarily (fully) satisfied. In some cases, supply chain optimizer 106 will output both a feasible solution and an indication of one or more unsatisfied demands. The indication of unsatisfied demands is also presented into the user as part of the explanatory information provided by explanation device 102.

Figure 2:
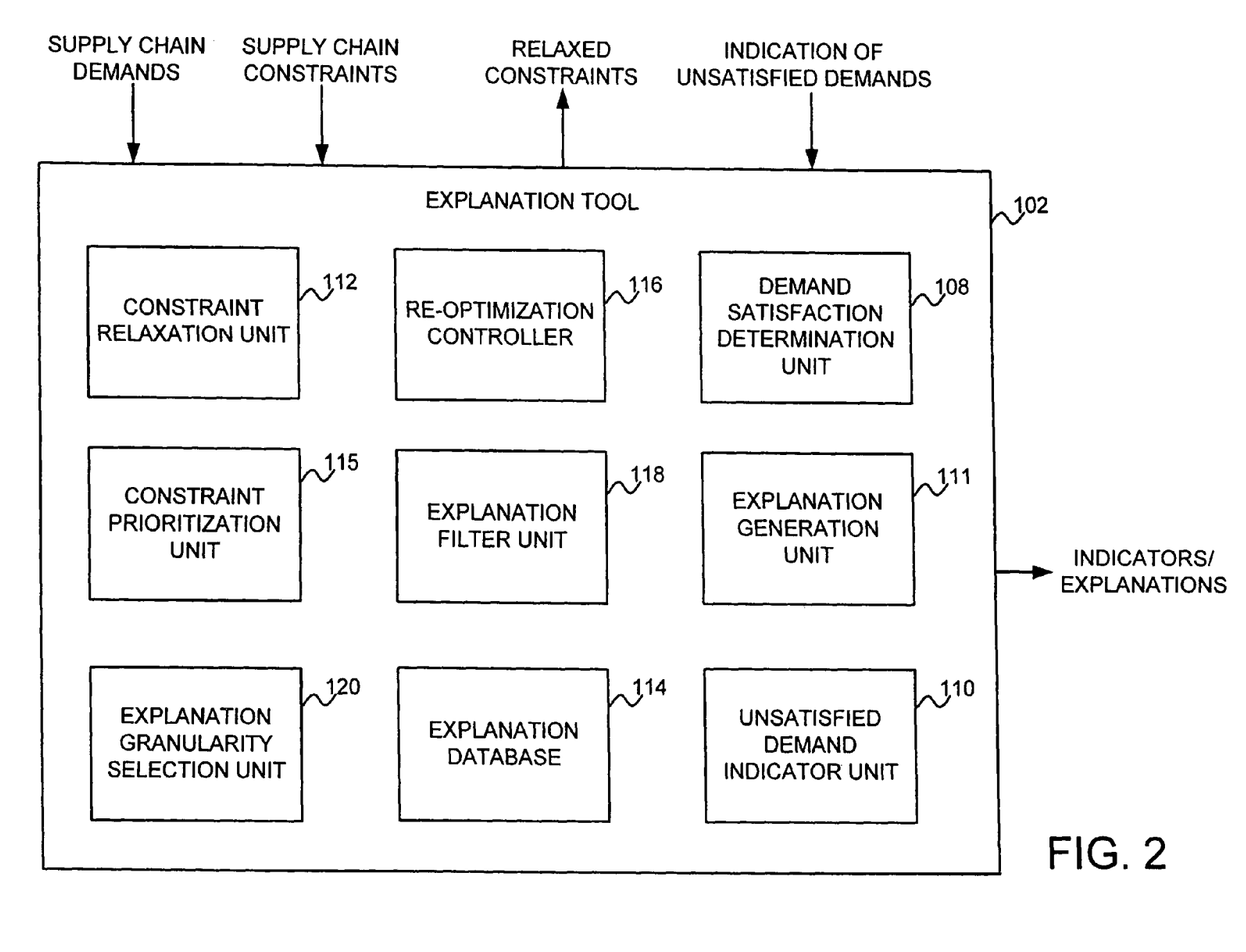
FIG. 2 is a block diagram illustrating pertinent components of the explanation device of FIG. 1.

Turning now to FIG. 2, pertinent components or sub-functions of explanation device 102 will be described. A demand satisfaction determination unit 108 receives a list of one or more unsatisfied demands from the supply chain optimizer and forwards the list to unsatisfied demand indicator unit 110, which presents the list of unsatisfied demands to the user via a graphical display (not shown). In response, the user may control the explanation device to generate a set of explanations for one or more of the unsatisfied demands. If so, a constraint relaxation unit 112 operates to relax one or more constraints that correspond to the unsatisfied demand. By "relax", is meant that the range of the constraint is expanded or the constraint is completely eliminated, thereby making it easier for the demand to be satisfied. The amount by which the constraint is relaxed may be determined with reference to previously determined parameters that are maintained within an explanation database 114.

The first constraint selected for relaxation is identified by a constraint prioritization unit 115. The constraints may be prioritized based on the particular demand that was not satisfied. In other cases, a set of pre-prioritized constraints is simply retrieved. In some implementations, multiple constraints are relaxed simultaneously, particularly constraints all selected from a common class of constraints, such as all "horizon" constraints or all "capacity" constraints. In the following, it will be assumed that only a single constraint is relaxed during each iteration of the re-optimization.

A re-optimization controller 116 then forwards the relaxed value of the selected constraint to supply chain database 104 (FIG. 1) and controls supply chain optimizer 106 to optimize the supply chain pursuant to the relaxed constraint. Demand satisfaction determination unit 108 then operates to determine whether the previously unsatisfied demand was satisfied during re-optimization. If the previously unsatisfied demand has now been satisfied, an explanation unit 111 is activated that operates to generate information for presentation to the user regarding the cause of the unsatisfied demand, based on whether the demand was satisfied during re-optimization using the relaxed constraint. Explanatory information is preferably presented to the user using the graphical display. The explanatory information to be presented may be derived, in part, from information previously stored within explanation device database 114. To limit the amount of information provided to the user, an explanation filter unit 118 is employed for filtering the explanatory information. Also, an explanation granularity selection unit 120 is used for setting the granularity or resolution of the explanatory information, as will be described below.

If the previously unsatisfied demand is still not satisfied despite re-optimization using the relaxed constraint, another constraint is selected by prioritization unit 115 for adjustment by constraint relaxation unit 112. Again, re-optimization controller 116 controls the supply chain optimizer to re-optimize the supply chain. The re-optimization procedure is preferably repeated until all previously unsatisfied demands have been satisfied. Explanatory information may be provided during each re-optimization cycle or, if preferred, only following a final re-optimization cycle.

Figure 3:
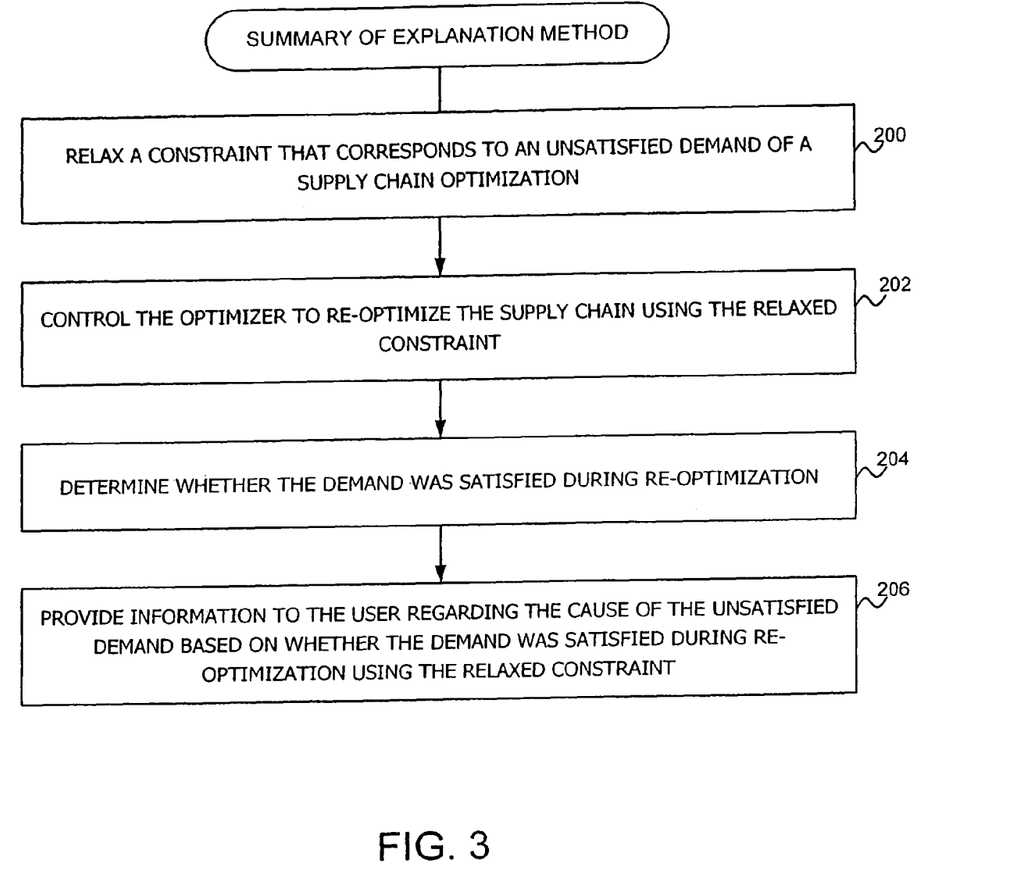
FIG. 3 is a flow chart summarizing steps performed by the explanation device of FIG. 1.

FIG. 3 provides a brief summary of the explanation method performed by the explanation device of FIG. 2 operating in conjunction with an automated supply chain optimizer. Beginning at step 200, the explanation device relaxes a constraint that corresponds to an unsatisfied demand arising during supply chain optimization. At step 202, the explanation device controls the supply chain optimizer to re-optimize the supply chain using the relaxed constraint. At step 204, the explanation device determines whether the demand was satisfied during re-optimization. Then, at step 206, the explanation device provides information to the user regarding the cause of the unsatisfied demand based on whether the demand was satisfied during re-optimization using the relaxed constraint.

In the following, details regarding an exemplary implementation of the explanation device of the invention will be provided. The explanation device is described in connection with an implementation wherein the supply chain optimizer is part of the aforementioned APO provided by SAP AG, used in conjunction with a SNP optimizer also provided by SAP AG.

2. Exemplary Implementation of Explanation Device

The explanation device is preferably a component of the SNP optimizer, which is modified, if needed, to provide indicators pertaining to quality/characteristics of a supply chain solution generated by the APO. Although the SNP optimizers are cost-based, costs may not be a sufficient indicator for the solution quality in case that penalty costs are used. Instead indicators are preferably employed that characterize the solution in terms of logistics. In particular, indicators are provided for evaluating the quality/characteristics of a solution with respect to: demand satisfaction; stock-level; and resource utilization. A resource may be defined, e.g., as referring to a machine, person, facility, warehouse, means of transportation or other asset with a limited capacity that fulfils a particular function in the supply chain. A resource's capacity may be defined, e.g., by a quantity (for example, transport or warehouse capacity) or a per-time rate (for example, production rate per day or week).

Indicators for evaluating demand satisfaction are preferably provided for all demand priority classes and aggregated over all of them: customer demands; corrected forecast demands; forecast demands; and (pseudo-hard) demands. Customer demands are demands resulting from a customer order. Forecast demands are typically derived only from information that has been collected in the past. Corrected forecast demands are forecast demands that have been adapted together with the customer or the responsible distribution unit. Pseudo-hard demands are demands that may be violated against very high (up to infinite) penalties. As the optimizer is searching for a cost-optimized solution, the use of pseudo-hard demands guarantees that these demands will be satisfied if possible. Should it not be possible to satisfy a pseudo-hard demand, very high penalties will occur. However, the explanation mechanism discussed herein would still have a feasible solution to start with re-optimization. Accordingly, in certain situations, pseudo-hard demands will be more suitable in the present context than hard demands (that might lead to not a single feasible solution on which the re-optimization could be based).

The following indicators are also preferably provided: service level; percentage of delayed satisfied demands; and average delay. The following stock-level indicators are also preferably provided: safety stock violation and stock quantity. (Since different stock keeping units (SKUs) may differ in their unit of measure, aggregation on unit of measure is not reasonable. Instead stock quantity is preferably reported in days-of-supply.) Solution indicators for the model aggregation level are preferably reported directly as part of the optimizer solution. In order to support further aggregation levels all location-product specific indicators are reported in the location-product aggregation-level as well as part of the optimizer result. In this way, simple aggregation is available. A location may be defined, e.g., as referring to a place or organizational entity at which quantities of products or resources are managed. Exemplary locations are a production plant, a distribution centre, a transportation zone, a stock transfer point, a storage location area, a customer, a vendor (external supplier), a subcontractor, a transportation service provider, a terminal, a geographical area, and a store. A product may be defined, e.g., as referring to a good that is the subject of business activity. A product can be used, consumed or created in the course of a production process. Thus, a product can be any of a raw product, an intermediate product and a final product. A location-product may then be defined by assigning a product to a specific location in a supply chain model. Similarly, a lane-product may be defined by assigning a product to a lane of transportation in a supply chain model.

In order to help users to understand optimizer solutions, functionality is provided that assists the user in finding the reasons for non-deliveries and safety stock violations. Within the SNP optimizer model there are only five possible reasons that can cause a non-delivery resp. safety stock violation:

Capacity problem (The demand is higher that the available resource capacity.) Bound problem (It is possible to restrict sources of supply via so called time series constraints. They enable the user to give upper bounds for production, transport and procurement and limit, in this way, the quantities that can flow through the supply network in order to satisfy a demand. In addition production and transportation can be limited by defining maximum lot constraints.)

Material availability problem (A non-delivery can occur as a consequence of limited source of supply or even by an incomplete bill of products.)

Leadtime-problem (The leadtime for the supply-network to let a certain location-product appear in a certain bucket can cover several buckets e.g. due to transportation durations, production durations and the usage of bucket offsets. Here, the term "bucket" is used in the conventional supply chain management (SCM) planning context and designates a period of time. Demands that are close to production, transportation or procurement horizons, at the beginning of the planning horizon or even in the past may not be satisfied in case that the lead-time covers the mentioned horizons, the beginning of the planning horizon or even the past.)

Cost problem (Demand satisfaction is a soft-constraint in the SNP optimizer. That means that in an optimization non-satisfying a demand is penalized with a certain cost value (non-delivery-penalty). If the non-delivery-penalty is too small, the optimizer may decide to not satisfy a demand in case that the overall costs are smaller than with satisfying it.)

The explanation-functionality for non-delivery and safety-violation consists of the above mentioned arguments. Corresponding explanatory information is output to the user.

Preferably, running the optimizer and explaining a result are decoupled, i.e. explanation is not part of the optimizer run. The user thereby has the choice of inspecting a solution and deciding afterwards whether parts of the solution require explanations. In order to ensure that a given plan which is subject to the explanation is feasible with respect to the underlying SNP optimizer model, the explanation functionality "explains" solutions stored in the SNP optimizer log. The explanation functionality is available in an interactive mode but is also applicable in the background.

As noted above, filters are used so that explanations provided for non-deliveries and safety stock violations are reasonable and are not too time consuming. The following four filters are provided:

Time Filters (Non-deliveries that are at the end of the planning horizon are less important to investigate then non-deliveries at the begin of the planning horizon, since the latter ones should be resolved if the plan is executed. For that purpose, an explanation horizon is employed. The horizon starts with a first bucket. The last bucket of the explanation horizon should be configurable. Only non-deliveries and safety-violations within the explanation horizon are subject to explanations.)

Location-products Filters (In many cases, explanations are only interesting for a subset of all location-products of a planning run. For example, only the non-deliveries for the most important products and/or customers should be explained. For that reason, it is possible to provide a sub-selection of all location-products in an optimization run. Two ways of selections are available: "selection via a selection" and "manual selection". Selection via a selection enables the use of a whole functionality for maintaining and saving selections)

Demand Priority Class Filters (From the viewpoint of the optimizer, demands are organized in various priority classes: Customer demand, corrected forecast and forecast (and pseudo-hard demands (only in the optimizer)). Non-deliveries are computed independently for the different priority classes. It is possible to restrict the explanation for non-deliveries to a certain priority class, e.g. customer demand.)

Threshold Filters (The optimizer is based on finite precision arithmetic. Hence, there exist results in which the optimizer-generated plans contain non-deliveries of small quantities (e.g. 1e-5). In order to rule out these non-deliveries from the explanation a threshold filter is employed. Moreover, in some cases it is only helpful to explain non-deliveries that are greater than a certain percentage value of the demanded quantity. For that reason, there are two filters: a relative filter for filtering in relation to the demanded quantity resp. required safety stock; and an absolute filter for filtering in terms of unit of measure for the corresponding location-products.)

As noted above, it is also possible to configure the precision or resolution of an explanation, i.e. to configure the granularity. The highest resolution is employed to explain, e.g., non-delivery per location-product and bucket and priority class by arguments mentioned above. A rougher granularity would be employed, e.g., to explain the non-delivery of one location-product over the complete explanation horizon, i.e. aggregated over time. In an explanation of this precision, it is not required to trace back, e.g., a capacity problem for a non-delivery in one particular bucket but it is sufficient to have an aggregated explanation for all non-deliveries in that horizon. Accordingly, the following "dimensions" to control the granularity should be available:

Time (There is a parameter to configure whether the non-deliveries or safety stock violations are explained on a per bucket basis or aggregated over time, i.e. over complete explanation horizon.)

Location/Product aggregation (Concerning location-products, different aggregation are reasonable and are available: per location-product; per product; per location; and all location-products.)

As already mentioned, an explanation (for non-delivery or safety stock violation) consists of the arguments or components: Capacity problem; Bound or Max-lot problem; Material availability problem; Leadtime-problem; and Cost problem. Each explanation refers to an explanation problem according to a specified explanation precision. For example, if each non-delivery for location-product and bucket and demand class is explained, the explanation report consists of potential number of entries equalling #location-product*#buckets*#priority classes. In order for the user to understand the relation to which explanation problem an explanation refers, it is preferred to relate both together in the reporting screen.

Each explanation is reported so as to contain (relative to the explanation precision) enough information for the user to investigate and potentially resolve the problem. Moreover, the explanation device makes a proposal consisting of modifications that would allow removal of the non-delivery resp. safety stock violation. For that purpose, the just mentioned arguments contain the following information:

Capacity Problem
    Resource,
    the bucket in which the capacity overload occurs
    the required additional capacity for resolving the non-delivery(ies) resp. safety-stock violation(s)

Bound Problem
    Activity resp. order type
    The bucket in which the bound is violated
    The required bound increase for resolving the non-delivery(ies) resp. safety-stock violation(s). The unit is
        For procurement unit of measure for the corresponding location-product
        For transport unit of measure for of the corresponding product
        For production number of production process model (PPM), applications in terms of the lot-size maintained in the PPM master data Material availability problem
    Location
    Product
    Bucket
    Required quantity of the location-product in base units of measure Leadtime problem
    Activity (resp. order type)
    Start date
    End date
    Required quantity
    Days in the corresponding horizon (production, transport, or procurement)
    Indicator for starting in the past resp. before the first bucket Cost problem
A message is generated informing the user about the cost problem for insufficient high non-delivery penalty resp. safety-stock violation penalty.

Figure 4:
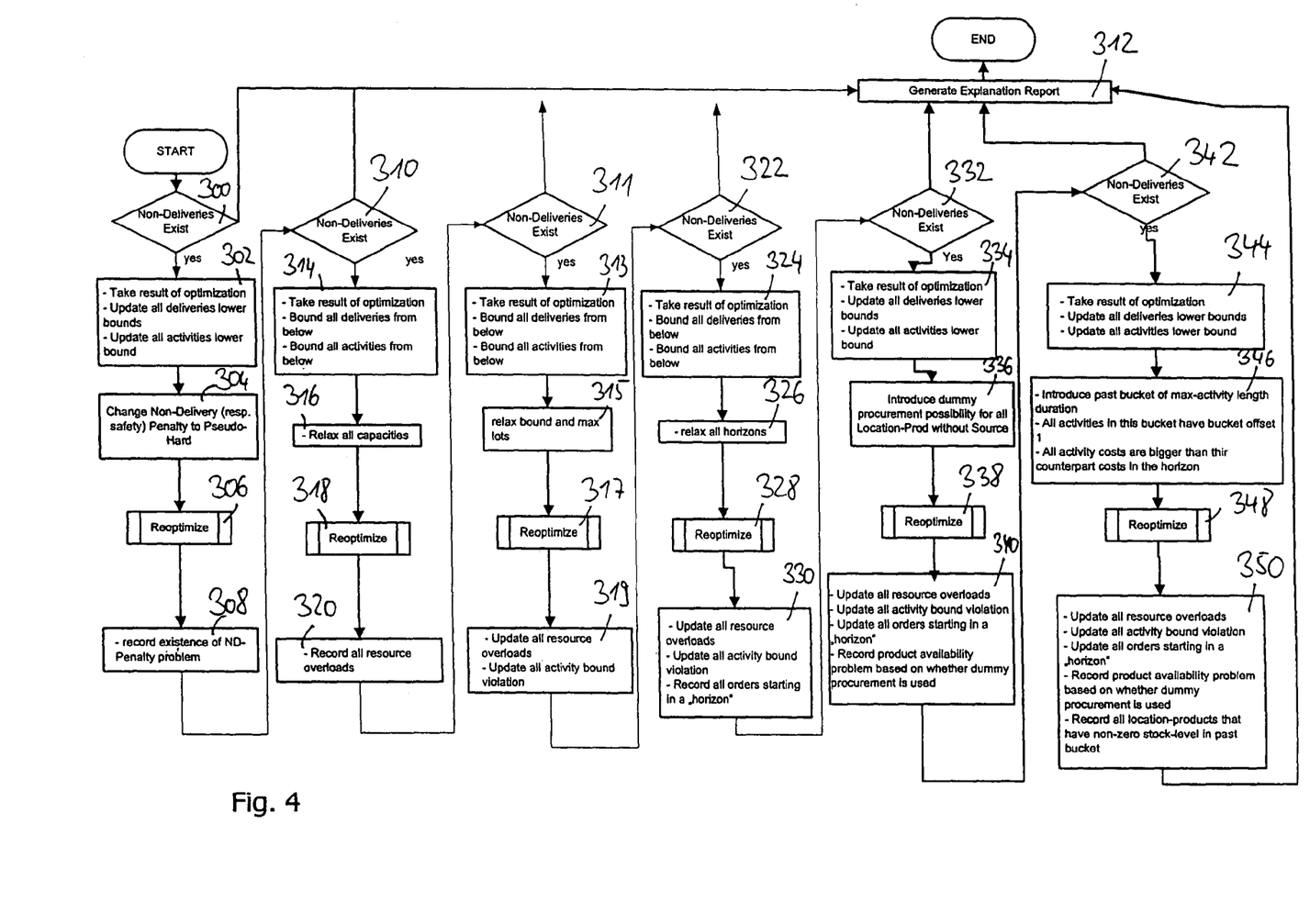
FIG. 4 is a flow chart illustrating in detail an exemplary implementation of the method of FIG. 3.

Turning now to FIG. 4, a detailed description of a series of exemplary re-optimization cycles will now be provided. In the example of FIG. 4, an explanation report is generated by the explanation device only after an optimization solution is achieved that has no non-deliveries. In other words, an explanation report is not generated after each re-optimization. Rather, a single explanation report is generated only after all non-delivery problems have been eliminated or after there are no further meaningful constraints to relax. The resulting report can contain results of all re-optimization phases. It should be noted that FIG. 4 shows an exemplary arrangement of a plurality of possible parallel paths. If necessary, one or more of these paths can be omitted or arranged in a different order.

Assuming at least one non-delivery (or partial delivery) is found to exist within an initial optimization, as determined at decision block 300, then step 302 is performed wherein all delivery lower bounds and all activity lower bounds are updated, i.e. any new information regarding deliveries and activities is used to update the lower bounds of these parameters. At step 304 any non-delivery penalties are changed to pseudo-hard penalties At step 306, the supply chain is then re-optimized and any non-delivery penalty problems detected during re-optimization are recorded at step 308 for use in generating a subsequent explanation report. If at decision block 310 some or all non-delivery problems have been eliminated then the corresponding explanations are stored for later usage in reporting step 312, which indicates that the eliminated original non-delivery problem (or parts thereof) was likely due to the insufficiently high non-delivery penalty.

If, however, additional non-deliveries exist, then step 314 is performed, wherein all deliveries and all activities are bound from below. By "bound from below", it is meant that only a lower threshold or constraint is employed. Then, at step 316, all capacity constraints are relaxed. That is, these parameters are set to wider ranges than previously specified by the user. Re-optimization is again performed at step 318 and, at step 320, any resource overloads are recorded. If at decision block 311 some or all non-delivery problems have been eliminated then the corresponding explanations are stored for later usage in reporting step 312, which indicates that the original non-delivery problem (or parts thereof) was likely due to the resource overloads. Recommendations are provided that constraints pertaining to capacities, should be adjusted by the user.

If, at decision block 311, it is determined that non-deliveries still exist, then step 313 is performed, wherein all deliveries and all activities are bound from below. Then, at step 315, activity bounds and maximum lot constraints are relaxed. In other words, these parameters are set to wider ranges than initially defined. At a next step 317, re-optimization is performed and, at step 319, any resource overloads are updated. Additionally, any activity bound violation is updated at step 319. If at decision block 322 some or all non-delivery problems have been eliminated then the corresponding explanations are stored for later usage in reporting step 312, which indicates that the original non-delivery problem (or parts thereof) was likely due to activity bounds and/or maximum lot constraints. Recommendations are provided that the corresponding constraints should be adjusted.

If still further non-deliveries exist, then step 324 is performed wherein, again, all deliveries and all activities are bound from below. Next, at step 326, all horizons are relaxed, i.e. the horizons are expanded further. Re-optimization is again performed at step 328. At step 330, any previously recorded resource overloads are updated. Likewise, any previously recorded activity bound violations are updated. Also, all orders starting in the "horizon" are recorded. If at decision block 332 some or all non-delivery problems have been eliminated then the corresponding explanations are stored for later usage in reporting step 312, which indicates that the original non-delivery problem (or parts thereof) was likely due leadtime problem with the horizons for production, distribution or procurement. Recommendations are provided that constraints pertaining to horizons should be adjusted by the user.

If delivery problems still occur, then step 334 is performed, wherein all activity and delivery lower bounds are again updated. At step 336, "dummy" procurement possibilities are introduced for all location-products without corresponding sources. In the present context, "dummy" procurement possibilities are "artificial" procurement possibilities that are introduced for location-products in an attempt to identify material availability problems.

Re-optimization is again performed at step 338. At step 340, resource overloads, activity bound violations, and horizon orders are again updated. Additionally, an indication is recorded of a possible product availability problem based on whether the dummy procurement is used. If at decision block 342 some or all non-delivery problems have been eliminated then the corresponding explanations are stored for later usage in reporting step 312, which indicates that the original non-delivery problem (or parts thereof) was likely due to product availability problems. Recommendations are provided that constraints pertaining to product availability should be adjusted by the user.

If non-deliveries still exists, one final re-optimization cycle is performed. At step 344, all delivery and activity lower bounds are again updated. At step 346, a new "past" bucket is introduced which pertains to maximum-activity length duration. All activities recorded in this bucket are set to have a bucket offset of one. All activity costs in the bucket are set to be bigger than their counterpart costs in the horizon. The final re-optimization is performed at step 348. At step 350, resource overloads activity bound violations are updated again. Also, all orders starting in the horizon are updated. Additionally, product availability problems based on whether a dummy procurement is used are recorded. Finally, all location-products that have non-zero stock-level in the "past" bucket introduced at step 346 are recorded. An explanation report is then generated at step 312. The explanation report indicates that the original non-delivery problem was likely due to leadtime problem with the planning horizon. Recommendations are provided that constraints pertaining to location-products should be adjusted by the user.

FIGS. 5 to 10 show graphical user interfaces (GUIs) that output for three different demands (as displayed in the upper window) the explanatory information obtained during the re-optimization cycles discussed above with reference to FIG. 4.

Figure 5:
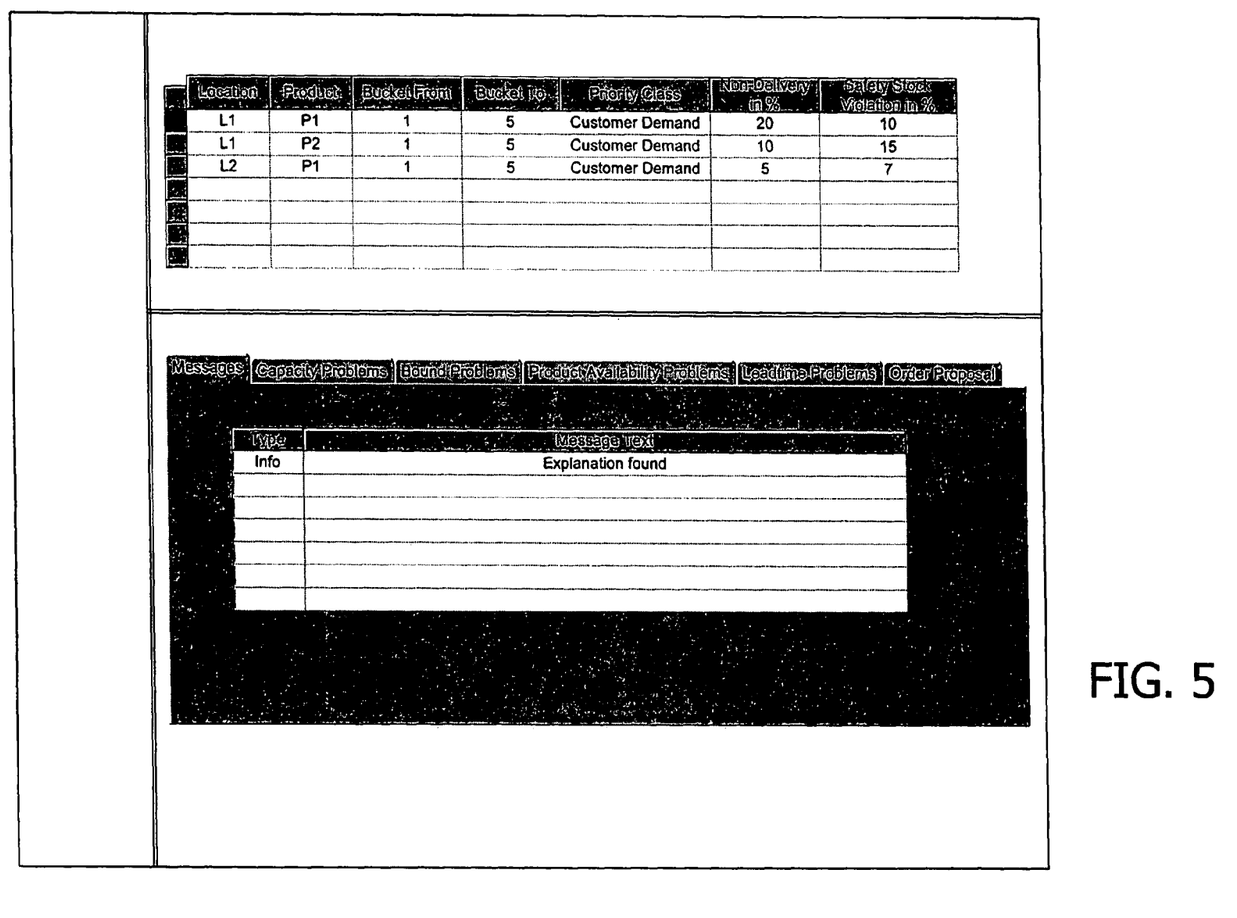
FIGS. 5 to 10 show graphical user interfaces for providing explanatory information to a user.
Figure 6:
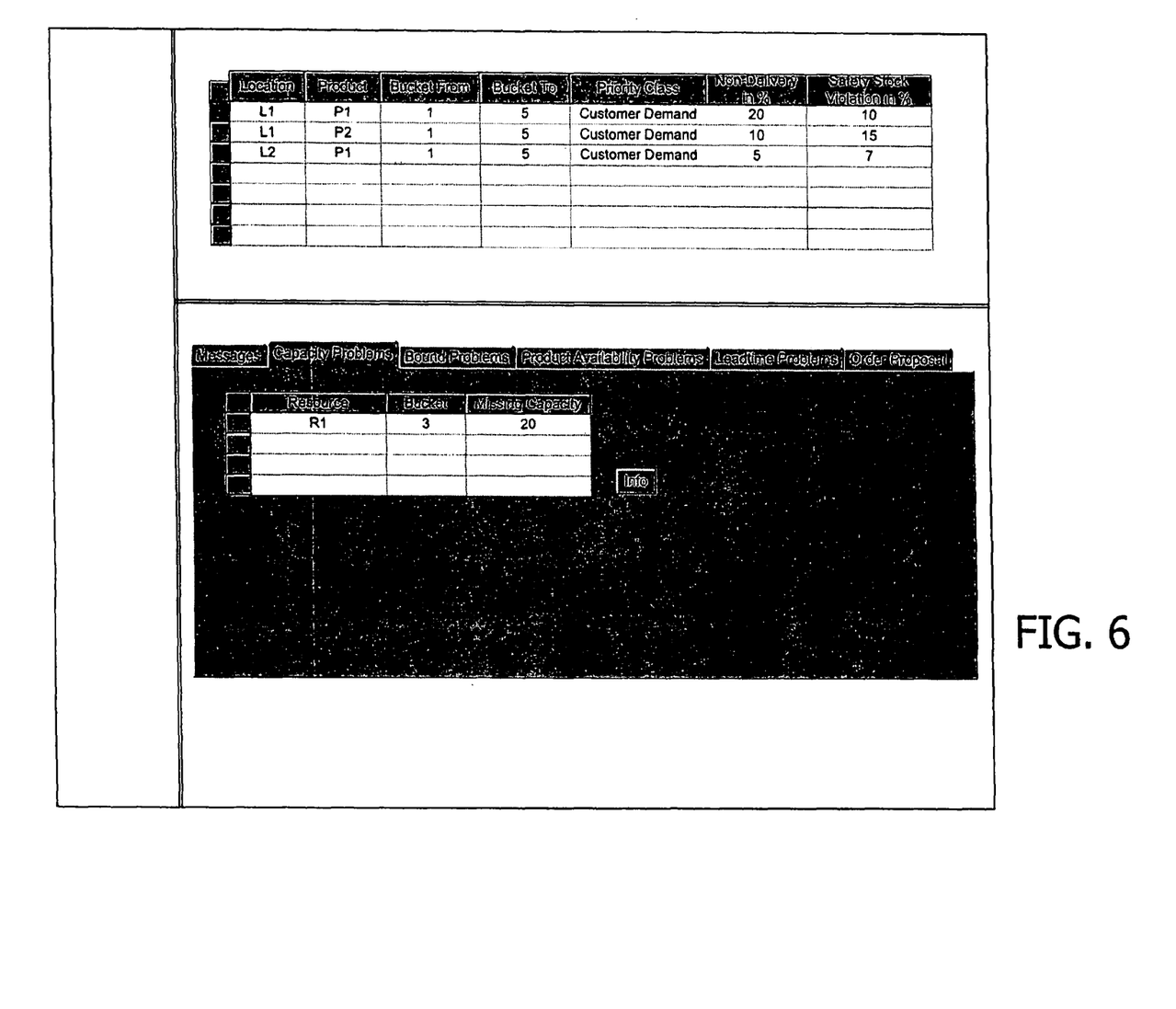
Figure 7:
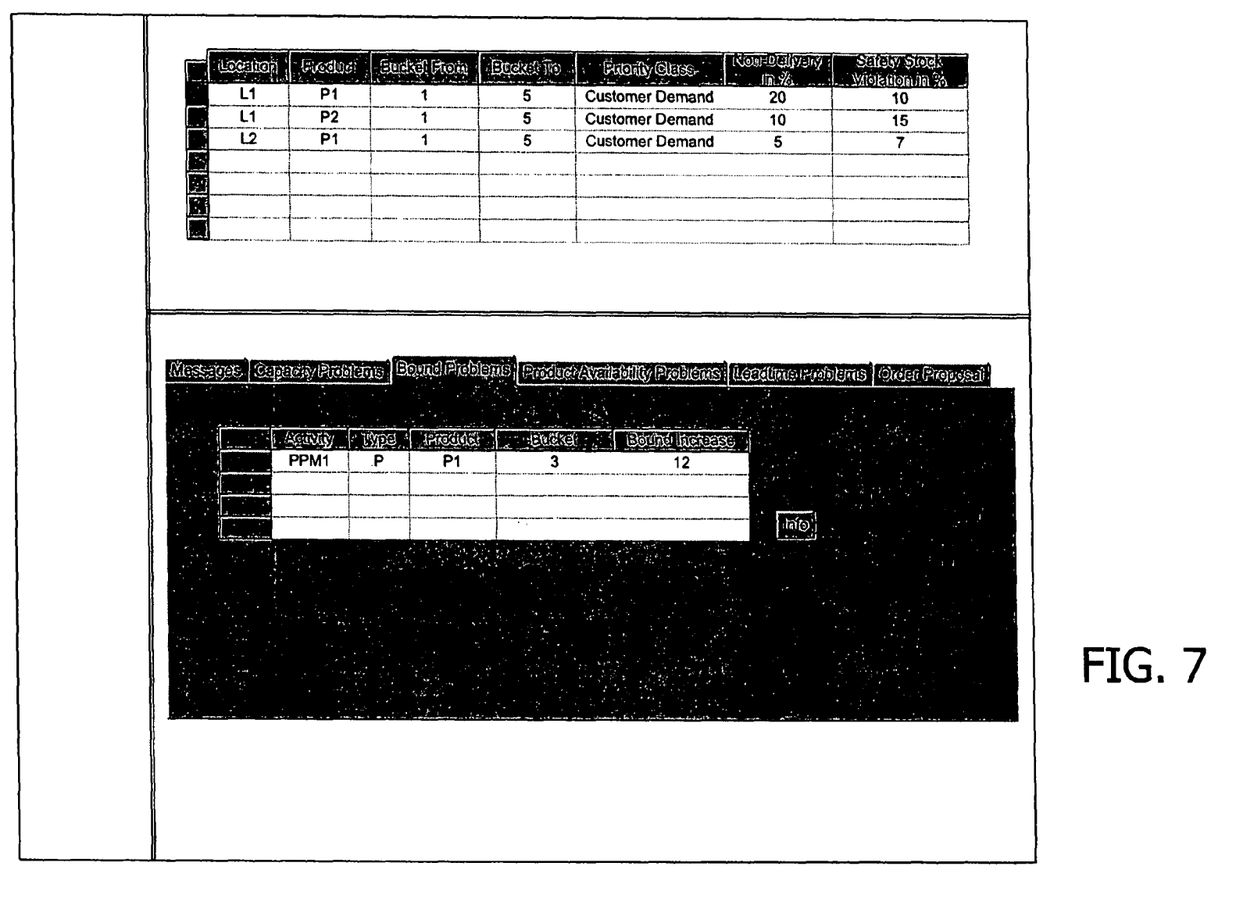
Figure 8:
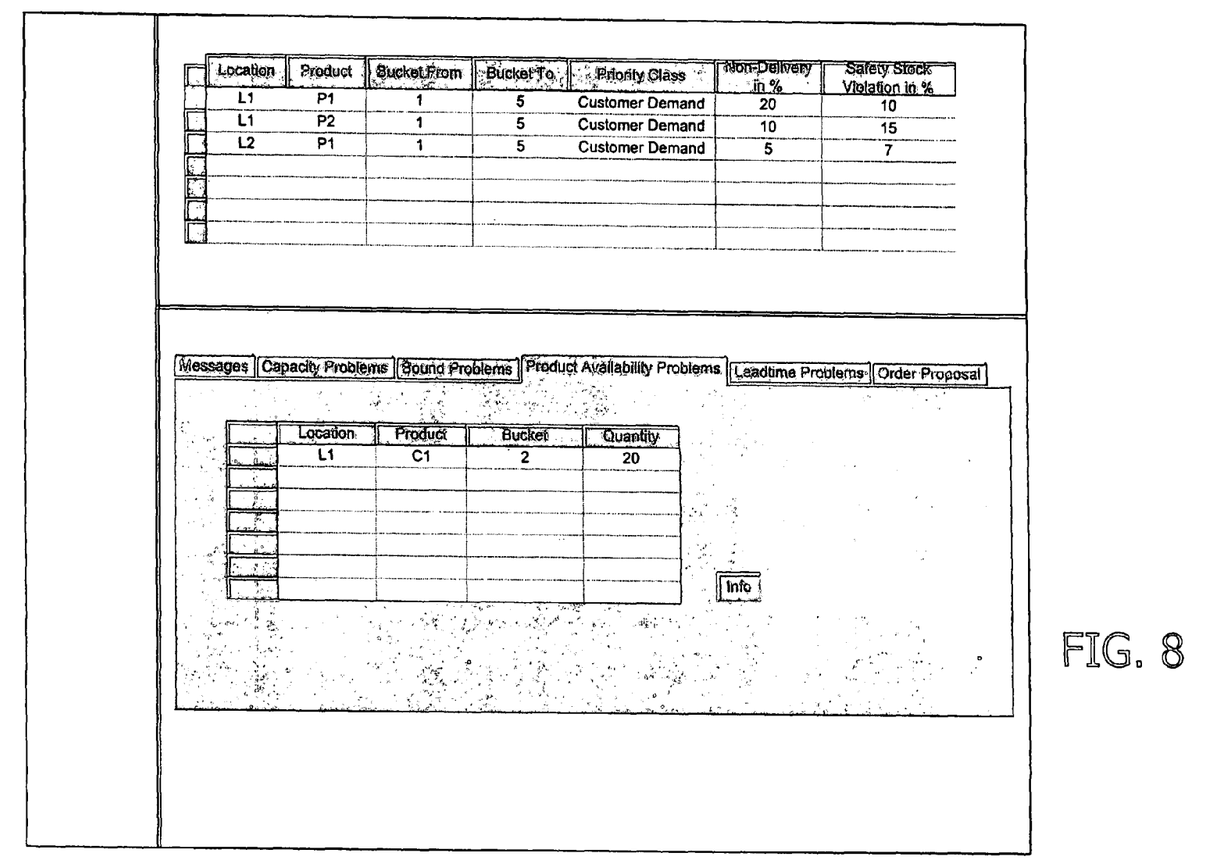
Figure 9:
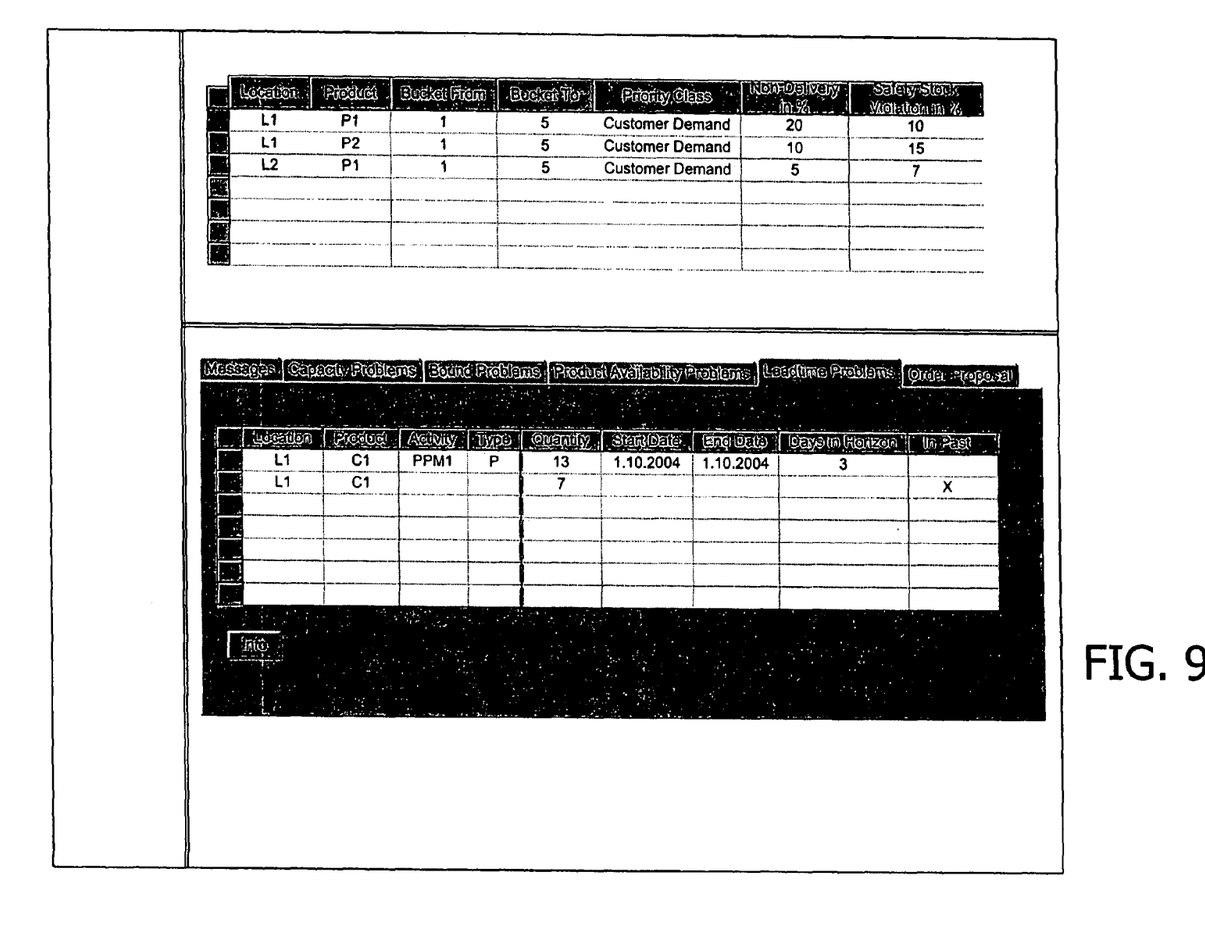
Figure 10:
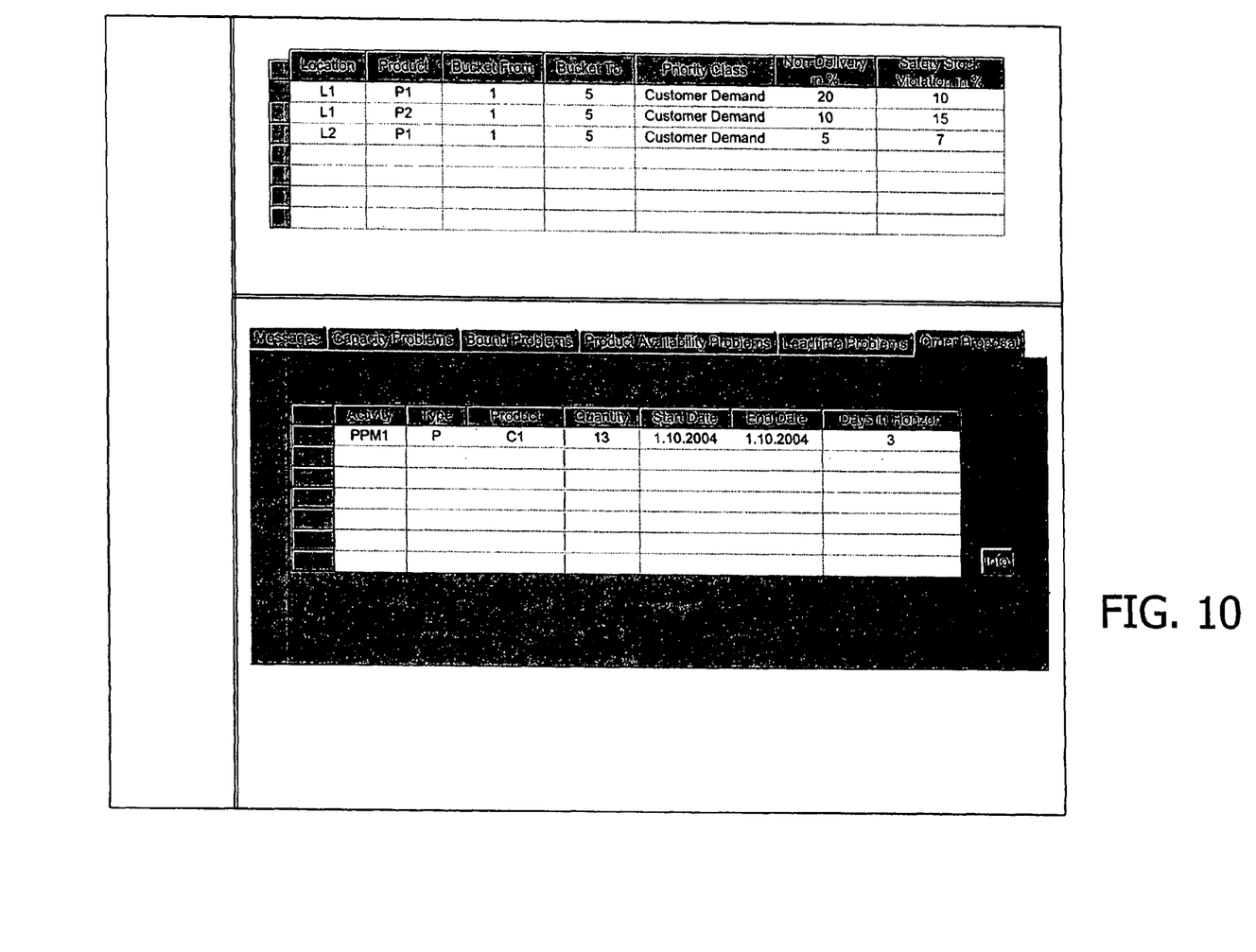

The GUI of FIG. 5 indicates in the lower window that the re-optimization cycles delivered information why certain demands could not be satisfied. The user may now click through the individual tabs shown in the lower window to retrieve the respective information. The GUI of FIG. 6 for example informs the user that there are capacity problems in relation to resource RI. The GUI of FIG. 7 explains that there are bound or max lot problems with respect to the activity PPM1. Product availability problems are display in the GUI if FIG. 8, while FIG. 9 shows all leadtime problems. Finally FIG. 10 shows a GUI with an order proposal that would eliminate the non-delivery caused by the problems indicated in the previous GUIs.

The re-optimization approach discussed above is technically compatible with the APO tool and can therefore easily be coupled therewith. The relaxation of one or more constraints preceding each re-optimization is a technical approach that delivers information with an explanatory meaning to a user. In the above embodiment, the combination of successive constraint relaxation on the one hand and re-optimization calculations on the other hand synergistically contributes to the usefulness of the explanation device.

While the invention has been described with reference to preferred embodiments, those skilled in the art will understand that various changes may be made and equivalents may be substituted without departing from the scope of the invention. In addition, many modifications may be made to adapt a particular step or structure to the teachings of the invention without departing from its scope. Therefore, it is intended that the invention not be limited to the particular embodiment disclosed, but that the invention will include all embodiments falling within the scope of the appended claims.

The invention claimed is:

1. A method for use with an automated supply chain optimizer that optimizes a supply chain subject to at least one user demand and one or more corresponding constraints, the method providing information regarding an unsatisfied demand, the method comprising:

relaxing a constraint that potentially corresponds to the unsatisfied demand;

controlling, in a computer, the optimizer to re-optimize the supply chain using the relaxed constraint;

determining whether the demand was satisfied during re-optimization;

providing information to the user regarding the cause of the unsatisfied demand based on whether the demand was satisfied during re-optimization using the relaxed constraint; and prioritizing the constraints wherein the constraints include one or more of non-delivery penalty constraints, capacity constraints, activity bound and maximum lot constraints, material availability constraints, horizon constraints and cost constraints and wherein the constraints are prioritized in the order of: non-delivery penalty constraints; capacity constraints; activity bound and maximum lot constraints; horizon constraints; material availability constraints; and cost constraints.

2. The method of claim 1, wherein providing information to the user includes providing an indication, if the demand was satisfied during re-optimization, that the constraint that was relaxed was a factor in the original, unsatisfied demand.

3. The method of claim 2, wherein providing information to the user further includes:
   determining an amount by which the constraint was originally violated during an initial optimization; and
   providing an indication of that amount to the user.

4. The method of claim 1, wherein providing information to the user includes providing an indication, if the demand was still not satisfied during re-optimization, that the constraint that was relaxed was not a significant factor in the unsatisfied demand.

5. The method of claim 1, further comprising:
   iteratively performing the relaxing a constraint, controlling the optimizer to re-optimize the supply chain using the relaxed constraint, and then determining whether the demand was satisfied during re-optimization using a plurality of different constraints until the demand is ultimately satisfied.

6. The method of claim 1, wherein providing information to the user regarding the cause of the unsatisfied demand includes:
   filtering the information provided to the user.

7. The method of claim 6, wherein filtering the information provided to the user includes filtering based on time, location-products, demand priority classes and thresholds.

8. The method of claim 1, wherein providing information to the user regarding the cause of the unsatisfied demand includes:
   setting a granularity of information provided to the user based on the cause of the unsatisfied demand.

9. The method of claim 1, further comprising:
   providing recommendations regarding constraints that could be modified to allow an unsatisfied demand to be satisfied during a subsequent optimization.

10. The method of claim 9, wherein the recommendations include an order proposal.

11. The method of claim 1, wherein relaxing a constraint comprises:
    modifying a hard constraint to a pseudo-hard constraint.

12. A non-transitory machine-accessible medium containing instructions that when executed cause a machine to:
    relax a constraint that potentially corresponds to an unsatisfied demand;
    control an optimizer to re-optimize a supply chain using the relaxed constraint;
    determine whether the demand was satisfied during re-optimization;
    provide information to a user regarding the cause of the unsatisfied demand based on whether the demand was satisfied during re-optimization using the relaxed constraint; and
    prioritize the constraints wherein the constraints include one or more of non-delivery penalty constraints, capacity constraints, activity bound and maximum lot constraints, material availability constraints, horizon constraints and cost constraints and wherein the constraints are prioritized in the order of: non-delivery penalty constraints; capacity constraints; activity bound and maximum lot constraints; horizon constraints; material availability constraints; and cost constraints.

13. The machine-accessible medium of claim 12, wherein instructions causing the machine to provide information cause the machine to:
    determine an amount by which the constraint was originally violated during an initial optimization; and
    provide an indication of that amount to the user.

14. The machine-accessible medium of claim 12, further comprising instructions causing the machine to:
    iteratively perform the relaxing a constraint, controlling the optimizer to re-optimize the supply chain using the relaxed constraint, and determining whether the demand was satisfied during re-optimization using a plurality of different constraints until the demand is ultimately satisfied.

15. An explanation device for use with an automated supply chain optimizer that optimizes a supply chain subject to at least one user demand and one or more corresponding constraints, the explanation device providing information regarding an unsatisfied demand, the explanation device comprising:
    a processor
    a constraint relaxation unit operative to relax a constraint that corresponds to the unsatisfied demand;
    a re-optimization controller unit operative to control the optimizer to re-optimize the supply chain using the relaxed constraint;
    a demand satisfaction determination unit operative to determine whether the demand was satisfied during re-optimization; and
    an explanation generation unit operative to generate information for presentation to the user regarding the cause of the unsatisfied demand based on whether the demand was satisfied during re-optimization using the relaxed constraint;
    a prioritization unit to prioritize the constraints wherein the constraints include one or more of non-delivery penalty constraints, capacity constraints, activity bound and maximum lot constraints, material availability constraints, horizon constraints and cost constraints and wherein the constraints are prioritized in the order of: non-delivery penalty constraints; capacity constraints; activity bound and maximum lot constraints; horizon constraints; material availability constraints; and cost constraints.

* * * * *